(No Model.)
E. D. ROBERTS.
WIRE STRETCHER.
No. 318,805. Patented May 26, 1885.
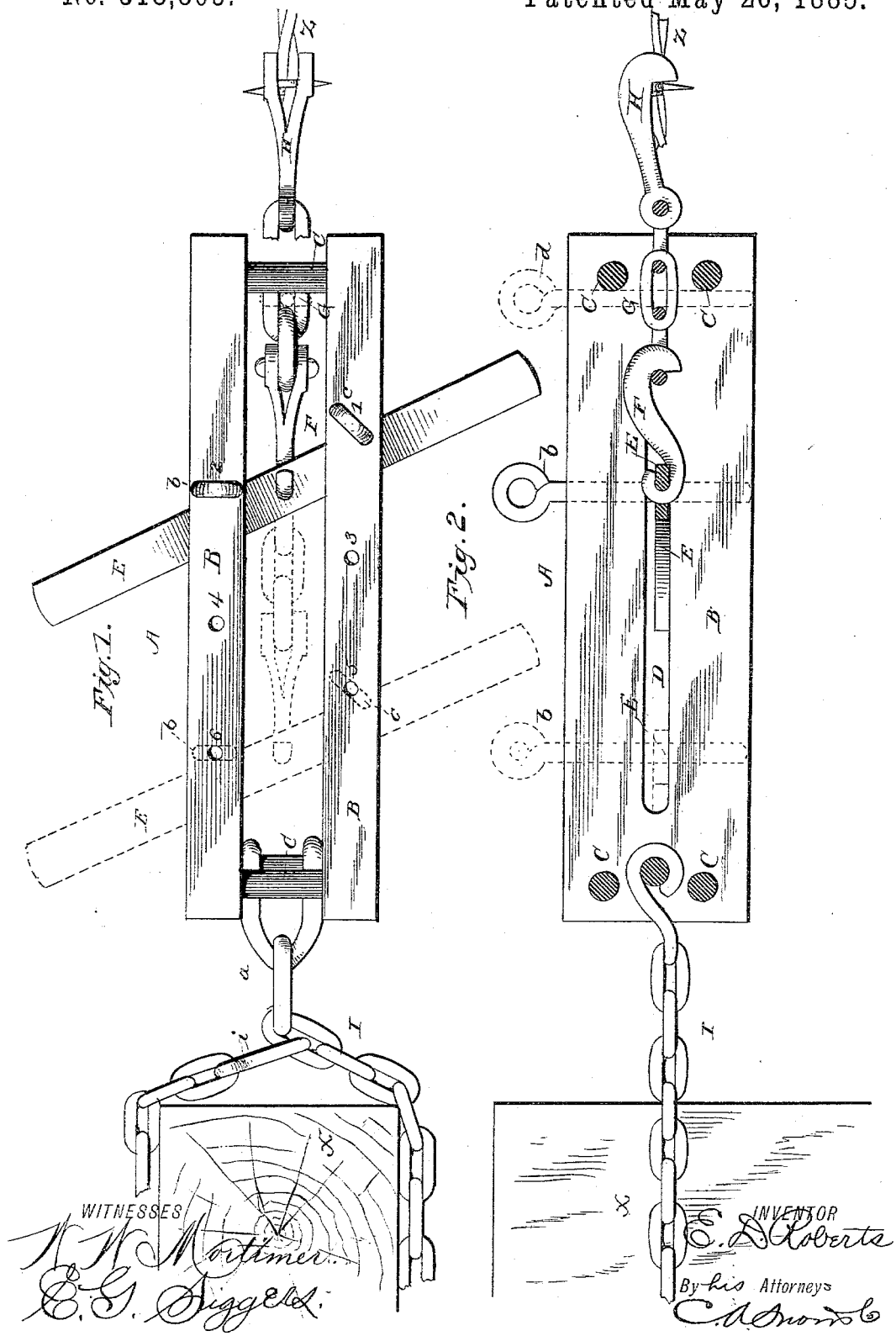

UNITED STATES PATENT OFFICE.

EDWARD D. ROBERTS, OF WILLIAMSBURG, IOWA.

WIRE-STRETCHER.

SPECIFICATION forming part of Letters Patent No. 318,805, dated May 26, 1885.

Application filed January 30, 1885. (No model.)

*To all whom it may concern:*

Be it known that I, EDWARD D. ROBERTS, a citizen of the United States, residing at Williamsburg, in the county of Iowa and State of Iowa, have invented a new and useful Improvement in Wire-Stretchers, of which the following is a specification, reference being had to the accompanying drawings.

My invention relates to an improvement in wire-stretchers; and it consists in the peculiar construction and combination of devices, that will be more fully set forth hereinafter, and particularly pointed out in the claim.

In the accompanying drawings, Figure 1 is a top plan view of my invention. Fig. 2 is a vertical longitudinal sectional view of the same.

A represents the stretcher-frame, which is composed of the side pieces, B, and the cross connecting-bars C, which connect the side pieces at their ends, as shown. Horizontal slots D are made through the side pieces and extend nearly from end to end thereof. Extending vertically through the sides B are a series of openings, 1 2 3 4 5 6, which are alternately on opposite side pieces, and which are out of line with each other, as shown at Fig. 1.

E represents a lever, which extends through the slots D and projects outwardly beyond the side pieces on each side, as shown, and to the center of this lever, in between the side pieces, is secured a hook, F, which has its hook end bifurcated, as shown.

G represents a chain, which is composed of links that are adapted to be caught by the hook F, and to one end of the chain is secured a hook, H, which is of similar construction to the hook F.

A chain, I, is secured to one end of the stretcher, as at *a*, and is provided with a hook, *i*, which adapts it to be secured to a post, *x*.

*b c* represent pins that are adapted to be inserted in the series of openings in the side pieces, and *d* represents a pin that is adapted to be passed through the links of the chain G on the inner side of the end bar, C.

The operation of my invention is as follows: Let Z represent the wire to be stretched. The stretcher A is secured to a post, *x*, by the chain I and hook *i*, and the chain G is secured to the hook F, while the hook H is secured to the wire. Before hooking the chain to the lever the wire is pulled as tightly as possible, and then one end of the lever is pulled rearwardly past the opening 1, and the pin *c* is inserted in said opening. The opposite end of the lever is then pulled rearwardly past the opening 2, and the pin *b* is placed therein, when the pin *c* is removed, the opposite end of the lever pulled rearwardly past the opening 3, and the pin *c* is then inserted therein. This operation is repeated until the opening 6 is reached, when the chain G is secured by inserting the pin *d* through one of its links inside the cross-bars. The hook F is then disengaged from the chain, and the lever moved back in the slots, the hook F is again inserted in the chain, the pin *d* is removed therefrom, and the operation is repeated until the wire has been stretched sufficiently.

I am aware that it has been heretofore proposed to employ machines consisting of a frame having the slots and the openings, the lever which extends through the slots, a hook secured to the lever, and pins adapted to be inserted in the openings behind the lever, for pulling stumps and similar purposes, and this construction, broadly, I disclaim.

Having thus described my invention, I claim—

The combination of the stretcher-frame having the slots and the openings, the lever which extends through the slots, a hook secured to the lever, and pins which are adapted to be inserted in the openings behind the lever, and a chain having a hook, the chain being adapted to be secured to the hook of the lever, and a pin for passing through the chain and securing it to the stretcher-frame, substantially as described.

In testimony that I claim the foregoing as my own I have hereto affixed my signature in presence of two witnesses.

EDWARD D. ROBERTS.

Witnesses:
W. N. MOORE,
EDW. G. SIGGERS.